(12) United States Patent
Tsuji et al.

(10) Patent No.: US 6,665,526 B2
(45) Date of Patent: Dec. 16, 2003

(54) MULTIPATH NOISE REDUCER, AUDIO OUTPUT CIRCUIT, AND FM RECEIVER

(75) Inventors: Masayuki Tsuji, Tokyo (JP); Eizi Asano, Tokyo (JP); Masahiro Tsujishita, Tokyo (JP); Kenichi Taura, Tokyo (JP); Masayuki Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 365 days.

(21) Appl. No.: 09/735,647

(22) Filed: Dec. 14, 2000

(65) Prior Publication Data

US 2001/0044289 A1 Nov. 22, 2001

(30) Foreign Application Priority Data

Dec. 22, 1999 (JP) .......................... 11-363647

(51) Int. Cl.[7] .............................. H04B 1/10
(52) U.S. Cl. .................... 455/296; 455/63; 455/65; 375/317; 375/346
(58) Field of Search ................. 455/296, 501, 455/506, 63, 65, 67.3, 570; 375/317, 346

(56) References Cited

U.S. PATENT DOCUMENTS

| | | |
|---|---|---|
| 4,356,568 A | 10/1982 | Ogita et al. |
| 4,620,315 A | 10/1986 | Imagawa |
| 5,390,344 A | 2/1995 | Nagata |
| 5,671,286 A | 9/1997 | Gottfried et al. |
| 5,784,465 A * | 7/1998 | Fujiwara ................ 381/10 |
| 5,812,673 A * | 9/1998 | Nohara .................. 381/13 |
| 6,154,547 A * | 11/2000 | Whitecar ............... 381/94.2 |
| 6,173,166 B1 * | 1/2001 | Whitecar ............... 455/296 |
| 6,385,261 B1 * | 5/2002 | Tsuji et al. ............ 375/346 |

FOREIGN PATENT DOCUMENTS

| | | |
|---|---|---|
| EP | 0 253 902 A1 | 1/1988 |
| EP | 0 449 199 A2 | 10/1991 |
| EP | 0 696 852 A2 | 2/1996 |
| EP | 0 881 779 A2 | 12/1998 |
| JP | 02283129 | 11/1990 |

* cited by examiner

Primary Examiner—William Trost
Assistant Examiner—Brandon J Miller
(74) Attorney, Agent, or Firm—Birch, Stewart, Kolasch & Birch, LLP

(57) ABSTRACT

A multipath noise reducer detects and removes the individual noise spikes occurring in an interval of multipath noise, thereby reducing the multipath noise with relatively little distortion of the output signal. The threshold signal used to detect multipath noise is varied depending on reception conditions. The gate pulses indicating the presence of multipath noise spikes are preferably expanded by variable amounts, depending on both reception conditions and the signal level. Multipath noise spikes are preferably replaced by a smoothed signal. These provisions further reduce perceived distortion of the audio output signal.

22 Claims, 13 Drawing Sheets

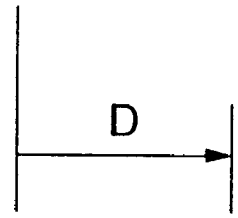

FIG. 6A
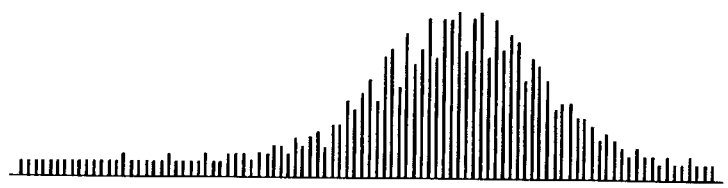
FIG. 6B
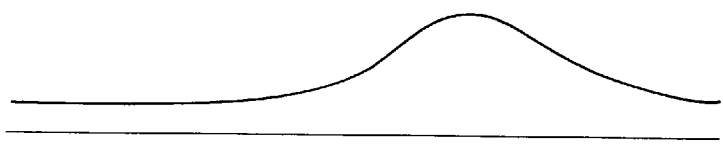
FIG. 6C
FIG. 6D
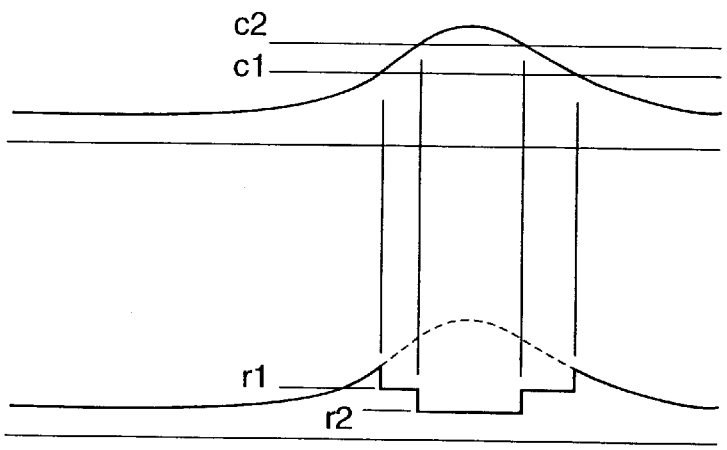

$c1' > c1, c2' > c2$

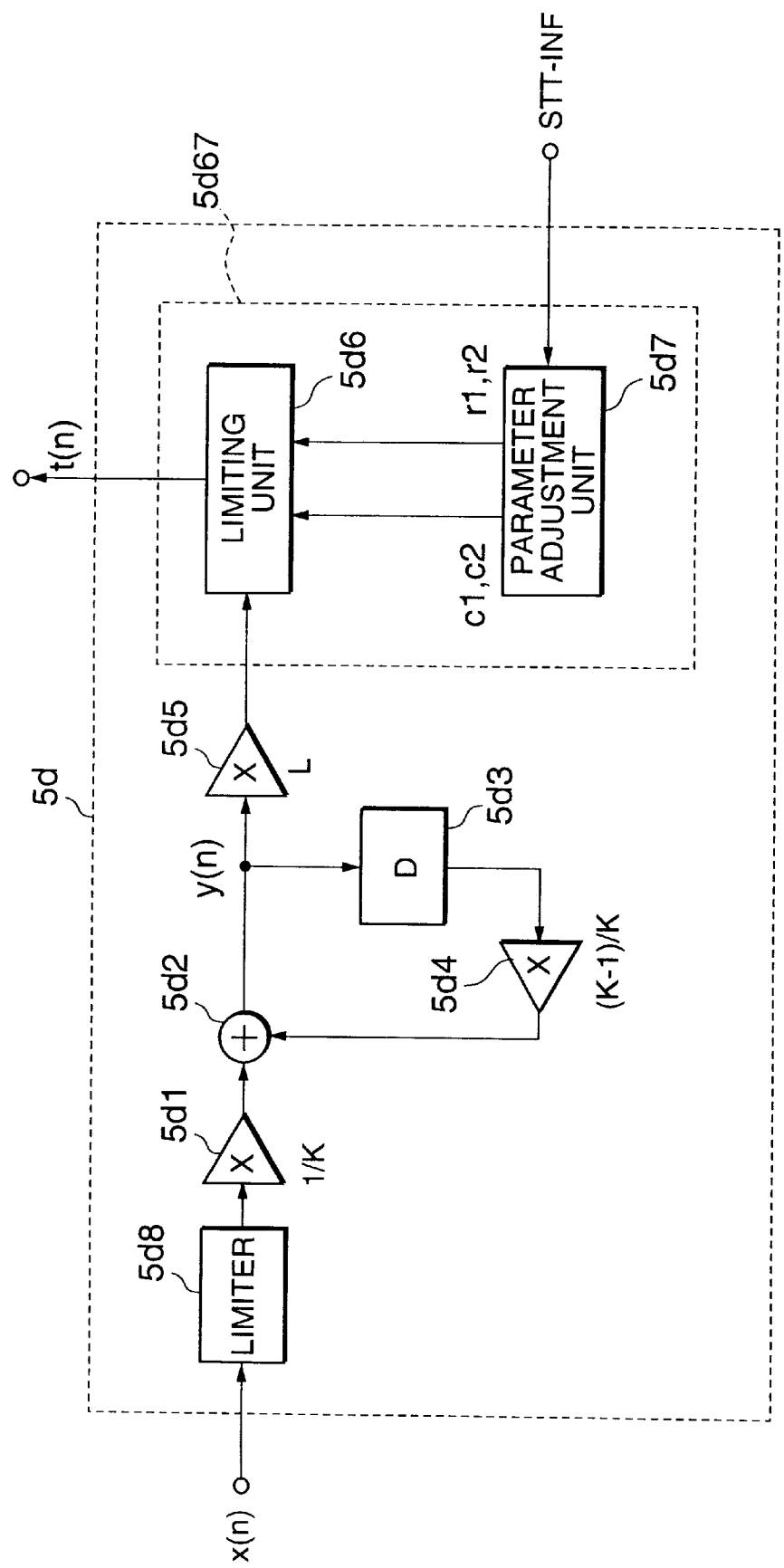

MULTIPATH NOISE REDUCER, AUDIO OUTPUT CIRCUIT, AND FM RECEIVER

BACKGROUND OF THE INVENTION

This invention relates to a multipath noise reducer, an audio output circuit including a multipath noise reducer, and a frequency-modulation (FM) radio receiver including a multipath noise reducer.

Radio receivers are afflicted by various types of electromagnetic noise. Radio broadcast receivers mounted in automobiles, for example, must contend with ignition noise and mirror noise, which are impulsive in character and are generally referred to as impulse noise. These so-called car radios also experience episodes of multipath noise due to reflection of radio waves from hills, high buildings, and other passing objects. Multipath noise occurs because the car radio antenna receives both a line-of-sight signal, coming directly from the transmitting antenna, and reflected signals, reflected from the passing objects. The reflected signals tend to be out of phase with the line-of-sight signal, causing the line-of-sight signal to be partly attenuated by the reflected signals. The resulting deterioration in quality of the audio output from a car radio is a familiar experience to automobile riders.

Various methods of reducing noise are known. In an FM stereo car radio, one method is to detect the strength of the electric field received at the antenna, and take noise countermeasures when the field is weak. One countermeasure is to reduce the degree of stereo separation, or to switch completely from stereo to monaural operation. This countermeasure will be referred to below as stereo separation control. Another countermeasure is to attenuate or "cut" high-frequency components in the demodulated signal. This countermeasure will be referred to below as high-cut control. Both of these countermeasures improve the signal-to-noise (S/N) ratio during intervals when the electric field received at the antenna is weak.

To reduce impulse noise, car radios may also include an impulse noise reducer that detects the onset of impulse noise and generates a gate signal having a predetermined length sufficient to cover the expected duration of the impulse noise. When the gate signal is active, the signal output by the car radio is held constant, effectively suppressing the noise.

The gate pulse used in this type of impulse noise reducer is too short to mask multipath noise, the duration of which is typically much longer than the duration of impulse noise. The gate pulse could be lengthened to cover multipath noise intervals, but a long gate pulse would noticeably distort the audio output signal. Furthermore, the long gate pulse would be triggered by each short occurrence of impulse noise, resulting in much needless audio distortion during times when no noise was present.

Another problem is that although the effects of multipath noise vary depending on signal reception conditions and the audio signal level, the gate pulse width is conventionally the same for all reception conditions and audio signal levels. Accordingly, regardless of how the gate pulse width is set, it will sometimes be too long, causing needless audio distortion, and will sometimes be too short, so that multipath noise is inadequately reduced.

Further details of these problems will be given in the detailed description of the invention.

SUMMARY OF THE INVENTION

An object of this invention is to reduce multipath noise adequately, with minimal output distortion.

The invented multipath noise reducer includes a signal state determiner determining a state of an input signal, a threshold generator generating a threshold value responsive to the resulting state information, a high-frequency signal extractor detecting high-frequency components of the input signal, a comparator unit comparing the resulting high-frequency signal with the threshold value, thereby generating a multipath noise detection signal, and a correction unit modifying the input signal responsive to the multipath noise detection signal and the state information.

By comparing the high-frequency signal with a threshold value, the invented multipath noise reducer is able detect and remove individual multipath noise spikes, thereby removing bursts of multipath noise without distorting other parts of the input signal.

By determining the threshold value adaptively, on the basis of the state information, and by modifying the input signal adaptively, again on the basis of the state information, the invented multipath noise reducer is able to reduce multipath noise adequately under all signal conditions, without unnecessary distortion.

The multipath noise reducer preferably also includes an input smoothing unit that smoothes the input signal. The smoothed input signal is used when the input signal is modified, enabling the correction unit to reduce distortion in the corrected signal still further.

In this case, the correction unit preferably includes a gate generator that generates a gate signal by expanding pulses in the multipath noise detection signal by an amount depending on the state information, and a replacement unit. The replacement unit latches the smoothed input signal during each expanded pulse in the gate signal, and replaces the input signal with the latched value for the duration of the expanded pulse. The length of the gate pulse is thereby tailored to signal conditions, and replacement of the input signal with possibly distorted values is avoided.

The gate generator preferably expands the gate pulses by increasing amounts as the received field strength of the input signal decreases, so that as the effects of multipath noise worsen, more of the multipath noise is removed.

The gate generator also preferably expands the gate pulses by increasing amounts as the audio signal level decreases, so that as multipath noise becomes more noticeable, more of the multipath noise is removed.

The high-frequency signal extractor preferably includes a high-pass filter and an absolute-value calculation unit, which together generate a high-frequency signal suitable for comparison with a threshold value.

The multipath high-pass filter preferably receives input from the absolute-value calculation unit, an arrangement that tends to shorten the intervals in which multipath noise is detected so that they match the actual multipath noise intervals more closely.

The threshold generator preferably includes a high-frequency smoothing unit that smoothes the high-frequency signal, and an adaptive limiting unit that limits the smoothed high-frequency signal according to the state information. The threshold value can thereby be kept from becoming too large during episodes of multipath noise.

The threshold generator may also include an amplitude limiter that limits variations of the high-frequency signal before the high-frequency signal is smoothed, so that the threshold value can be kept from becoming too large without the need for a long smoothing interval.

The adaptive limiting unit preferably includes a parameter adjustment unit that selects a comparison value and a limit value responsive to the state information, and a limiting unit that reduces the high-frequency signal to the limit value when the high-frequency signal exceeds the comparison value. The threshold value can thereby be lowered during episodes of multipath noise, so as to be sure of detecting all of the multipath noise.

The parameter adjustment unit preferably increases the comparison value as the received field strength of the input signal decreases, to avoid reducing the threshold value when multipath noise is absent.

The invention also provides an audio output circuit including the invented multipath noise reducer.

The invention furthermore provides an FM receiver including both the invented multipath noise reducer and an impulse noise reducer, the impulse noise reducer removing residual impulse noise from the corrected signal output by the multipath noise reducer.

The invention moreover provides a method of reducing multipath noise, essentially as described above. The invented method is useful when the invention is practiced using digital signal-processing circuitry.

BRIEF DESCRIPTION OF THE DRAWINGS

In the attached drawings:

FIGS. 6A to 6D are waveform diagrams illustrating the operation of the limiting unit in FIG. 5;

FIG. 8 is a block diagram illustrating another possible structure of the threshold generator in FIG. 1;

DETAILED DESCRIPTION OF THE INVENTION

Figure 1:
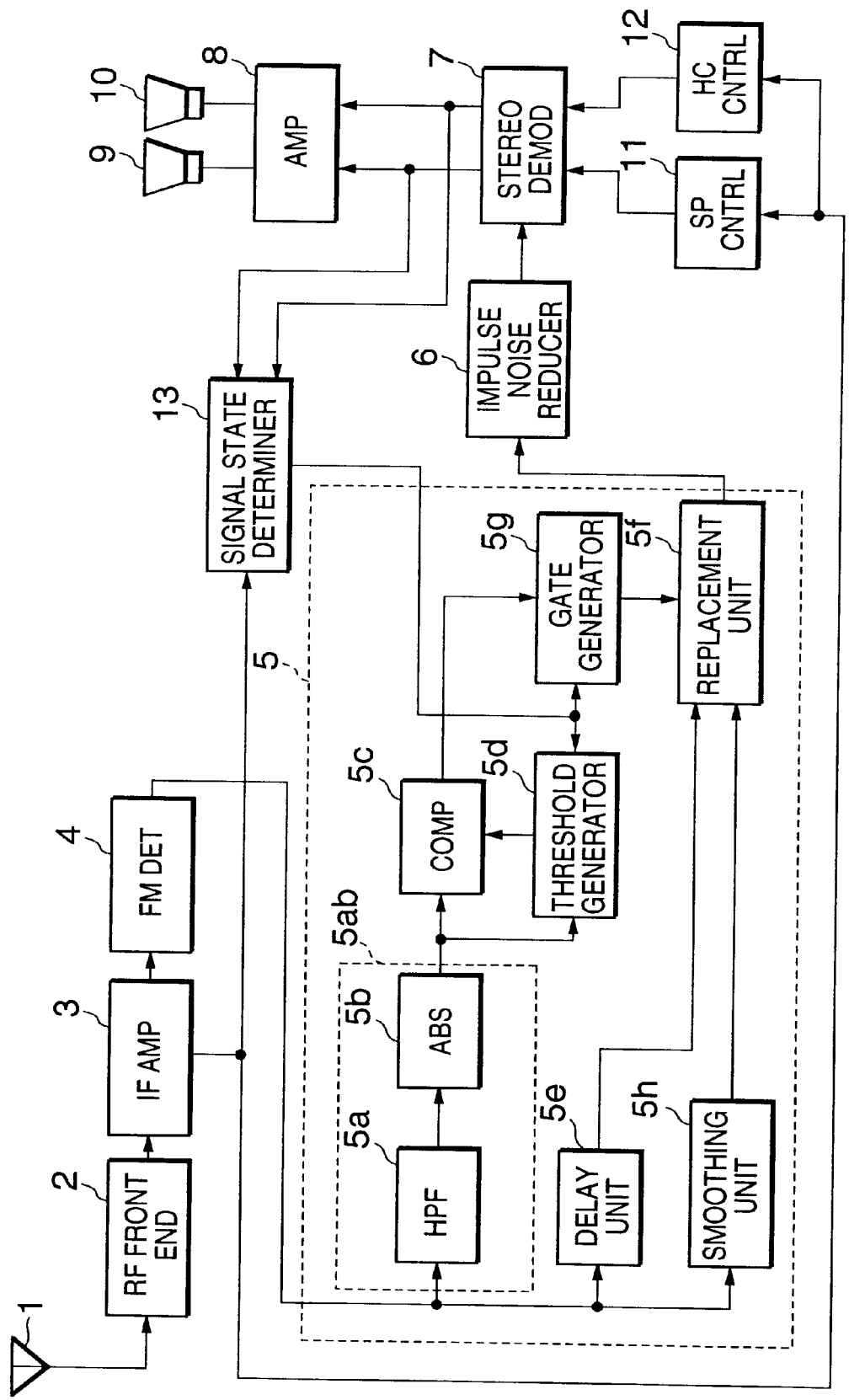
FIG. 1 is a block diagram of an FM stereo radio receiver illustrating a first embodiment of the invention.

Embodiments of the invention will be described with reference to the attached drawings, following a description of a conventional FM stereo radio receiver with an impulse noise reducer. This description is relevant because the impulse noise reducer is also used in the embodiments of the invention. Like elements in different drawings will be indicated by like reference characters.

Figure 13:
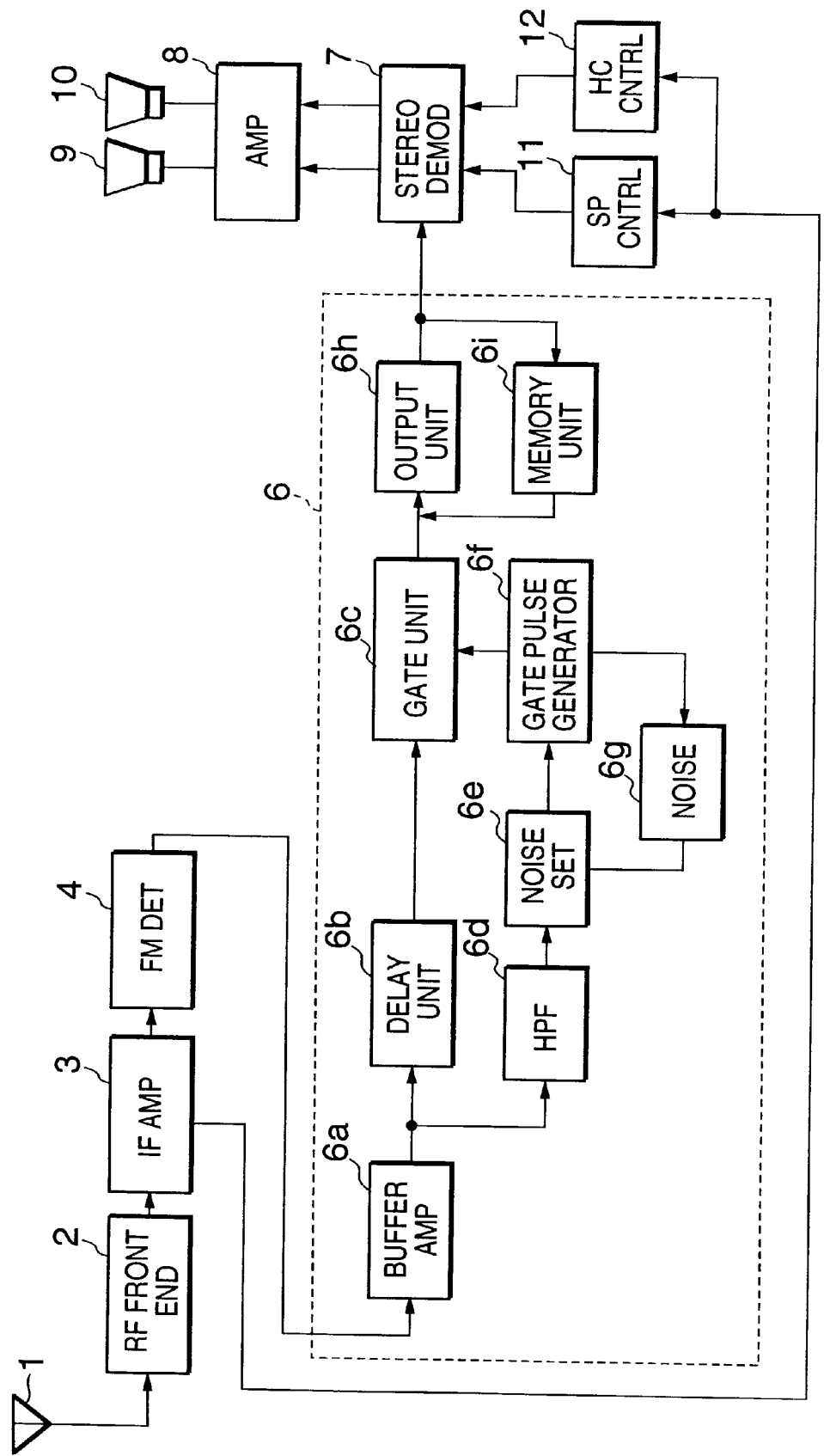
FIG. 13 is a block diagram of a conventional FM stereo radio receiver.

Referring to FIG. 13, the conventional FM stereo radio receiver comprises an antenna 1, a radio-frequency (RF) front-end circuit 2, an intermediate-frequency amplifier (IF AMP) 3, an FM detector (DET) 4, an impulse noise reducer 6, a stereo demodulator (DEMOD) 7, a low-frequency amplifier (AMP) 8, a pair of loudspeakers 9, 10, a stereo separation controller (SP CNTRL) 11, and a high-cut controller (HC CNTRL) 12.

The RF front end 2 amplifies the radio-frequency signal received from the antenna 1 and down-converts the amplified RF signal to the intermediate frequency. The IF amplifier 3 amplifies the resulting IF signal, and outputs both the amplified IF signal and a signal-meter signal or S-meter signal. The S-meter signal indicates the field strength received at the antenna. The FM detector 4 demodulates the amplified IF signal to generate an FM composite signal. The impulse noise reducer 6 reduces impulse noise in the FM composite signal. The stereo demodulator 7 separates the FM composite signal into a left-channel signal and a right-channel signal. The low-frequency amplifier 8 amplifies these two signals for output to the loudspeakers 9, 10. The stereo separation controller 11 performs stereo separation control on the basis of the S-meter signal. The high-cut controller 12 performs high-cut control, also on the basis of the S-meter signal.

The impulse noise reducer 6 comprises a buffer amplifier 6a, a delay unit 6b, a gate unit 6c, a high-pass filter (HPF) 6d that extracts high-frequency impulse noise from the output of the FM detector 4, a noise detector (DET) 6e, a gate pulse generator 6f that generates a gate pulse of a predetermined duration or width on the time axis when noise is detected, an automatic gain control (AGC) circuit 6g for the noise level, an output unit 6h, and a memory unit 6i that stores the immediately preceding output signal. When noise is not detected, the gate unit 6c remains closed, and the FM composite signal output from the FM detector 4 propagates through the buffer amplifier 6a, delay unit 6b, gate unit 6c, and output unit 6h to the stereo demodulator 7 and memory unit 6i. When noise is detected in the FM composite signal by the noise detector 6e, a gate pulse of the predetermined width is output from the gate pulse generator 6f, opening the gate unit 6c. While the gate unit 6c remains open, the output signal from the delay unit 6b is blocked, and the signal stored in the memory unit 6i just before noise was detected is output instead, so that the noise does not reach the stereo demodulator 7.

The impulse noise reducer 6 is designed primarily to reduce impulse noise, but when the FM composite signal includes multipath noise, the multipath noise is also detected, and is reduced to some extent.

Figures 2A, 2B:
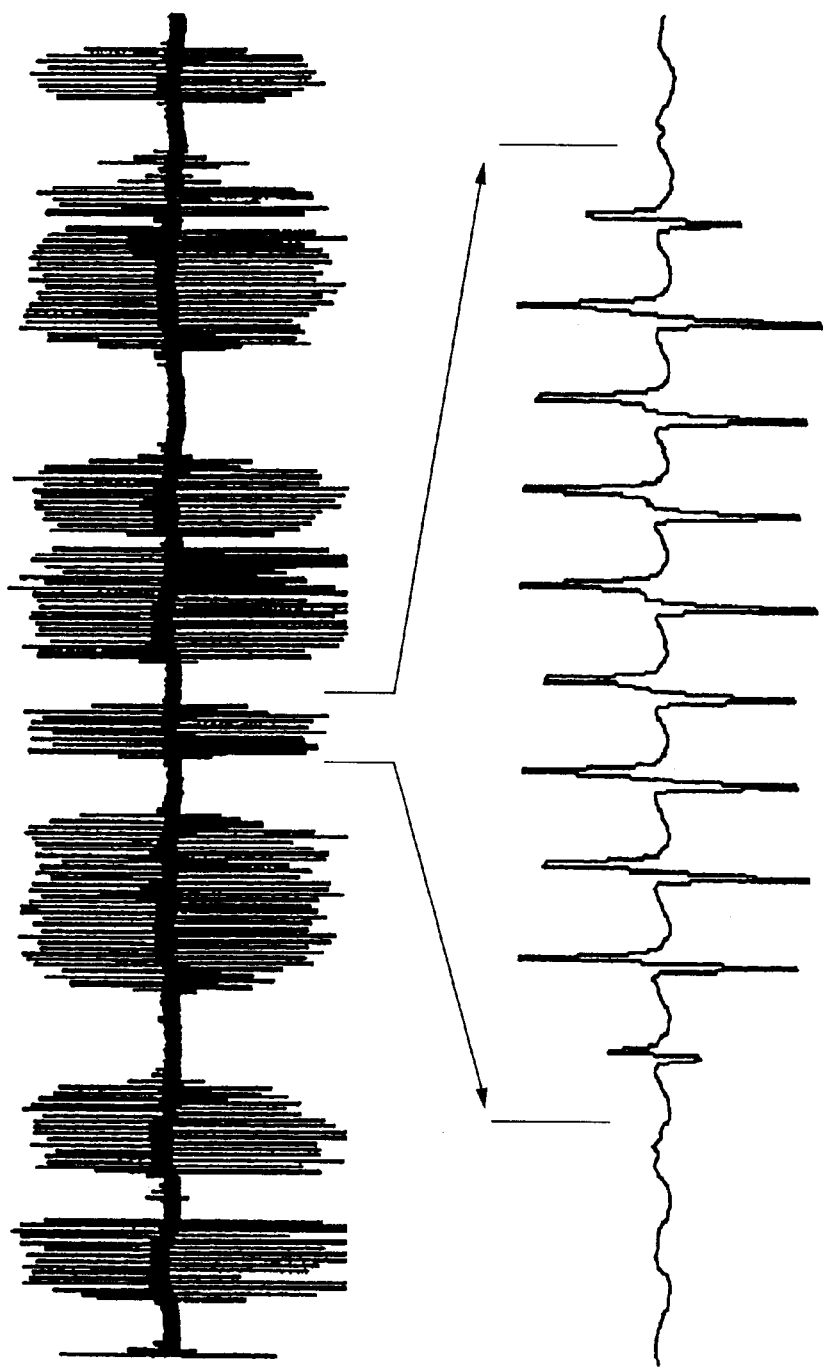
FIGS. 2A and 2B illustrate a typical multipath noise waveform.

The waveform in FIG. 2A shows a typical episode of multipath noise in an FM composite signal. The waveform in FIG. 2B shows an enlargement of one multipath noise burst. Multipath noise comprises a series of spikes occurring at intervals equal to the FM composite subcarrier period. The enlarged burst, for example, includes ten such noise spikes, each having a positive component and a negative component.

The gate pulse generated by the gate unit 6c, if set to reduce ignition noise, for example, has a width equivalent to only the first few spikes in the waveform in FIG. 2B. Consequently, the impulse noise reducer 6 is inadequate to the task of rejecting multipath noise. If the gate pulse width in the impulse noise reducer 6 were to be increased to cover the longest bursts of multipath noise, however, then much valid information would be lost following shorter bursts of multipath noise, leading to noticeable distortion of the audio output signal. In the worst case, the audio output signal might completely disappear for a noticeable length of time.

Valid information is also lost in the brief intervals between noise spikes in the multipath noise waveform.

As a first embodiment of the invention, FIG. 1 shows an FM stereo radio receiver comprising an antenna 1, an RF front end 2, an IF amplifier 3, an FM detector 4, a multipath noise reducer 5, an impulse noise reducer 6, a stereo demodulator 7, a low-frequency amplifier 8, a pair of loudspeakers 9, 10, a stereo separation controller 11, a high-cut controller 12, and a signal state determiner 13. The multipath noise reducer 5 comprises a high-pass filter (HPF) 5a, an absolute-value calculation unit (ABS) 5b, a comparator unit (COMP) 5c, a threshold generator 5d, a delay unit 5e, a replacement unit 5f, a gate generator 5g, and a smoothing unit 5h.

The high-pass filter 5a and absolute-value calculation unit 5b constitute a high-frequency signal extractor 5ab in which the output of the high-pass filter 5a becomes the input of the absolute-value calculation unit 5b. The gate generator 5g and replacement unit 5f constitute a correction unit. The multipath noise reducer 5, impulse noise reducer 6, stereo demodulator 7, low-frequency amplifier 8, stereo separation controller 11, high-cut controller 12, and signal state determiner 13 constitute an audio output circuit.

The elements other than the multipath noise reducer 5 and signal state determiner 13 are similar to the corresponding elements in the conventional FM receiver in FIG. 13, so detailed descriptions will be omitted. The gate pulse width in the impulse noise reducer 6 is adjusted for the removal of impulse noise such as, for example, automobile ignition noise.

The signal state determiner 13 and multipath noise reducer 5 may include either analog or digital circuit elements, or a combination of both. The signal state determiner 13 and multipath noise reducer 5 may also be implemented partly or entirely by software running on a computing device such as a digital signal processor.

Next, the overall operation of the first embodiment will be described.

An FM broadcast signal is received by the antenna 1 and processed by the RF front end 2, IF amplifier 3, and FM detector 4 as described above. The FM composite signal output by the FM detector 4 will be referred to below simply as a demodulated signal. The demodulated signal passes through the multipath noise reducer 5, which reduces multipath noise, then through the impulse noise reducer 6, which reduces impulse noise. After these two types of noise reduction, the demodulated signal is supplied to the stereo demodulator 7. The stereo demodulator 7, low-frequency amplifier 8, stereo separation controller 11, and high-cut controller 12 operate as in the conventional FM radio receiver. The amplified left-channel and right-channel audio signals are reproduced through the loudspeakers 9, 10. In addition, the S-meter signal from the IF amplifier 3 and the audio signals output from the stereo demodulator 7 are supplied to the signal state determiner 13. The signal state determiner 13 determines the state of the signal as received at the antenna 1 and as output from the stereo demodulator 7, recognizing both the received field strength and the audio signal level, and provides corresponding state information to the threshold generator 5d and gate generator 5g in the multipath noise reducer 5.

Next, the operation of the multipath noise reducer 5 will be described in more detail with reference to the waveforms in FIGS. 3A to 3E and 4A to 4C.

Figure 3A:
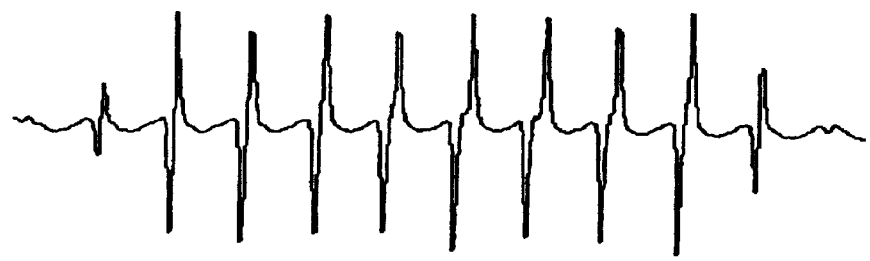
FIGS. 3A to 3E are waveform diagrams illustrating the operation of the multipath noise reducer in FIG. 1.
Figure 3B:
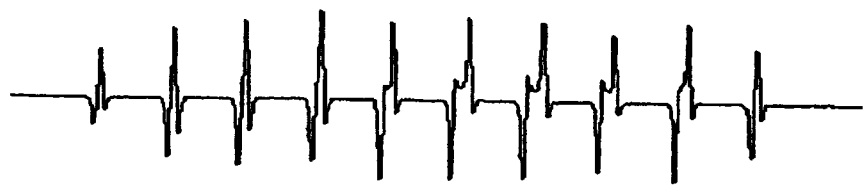

The waveform in FIG. 3A is the enlarged multipath noise waveform that was shown in FIG. 2B. The waveform in FIG. 3B is the corresponding output of the high-pass filter 5a in the multipath noise reducer 5. The cut-off frequency of the high-pass filter 5a is set to detect the noise spikes, while flattening out the slower variations between the noise spikes. The signal output by the high-pass filter 5a accordingly sits substantially at the ground level between noise spikes, and reverses between positive values in the rising parts of each noise spike and negative values in the falling parts of each noise spike.

Figure 3C:

The absolute-value calculation unit 5b rectifies the output of the high-pass filter 5a by replacing negative values with positive values of like magnitude, as shown in FIG. 3C. Multipath noise can accordingly be detected by comparing the signal output by the absolute-value calculation unit 5b with a threshold signal, indicated by the dotted line in this waveform (FIG. 3C). The comparison is performed by the comparator unit 5c; the threshold signal is generated by the threshold generator 5d. The comparison results are then modified by the gate generator 5g to generate a gate signal, shown in the FIG. 3D.

Figure 4A:
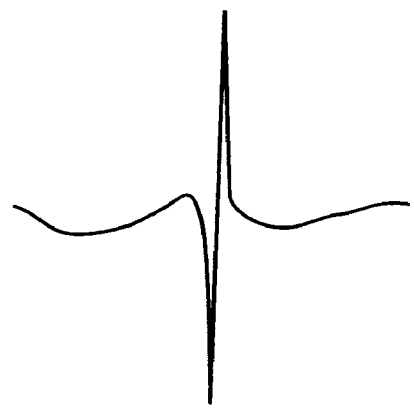
FIGS. 4A to 4C are waveform diagrams illustrating the operation of the comparator unit and gate generator in the multipath noise reducer.
Figure 4B:
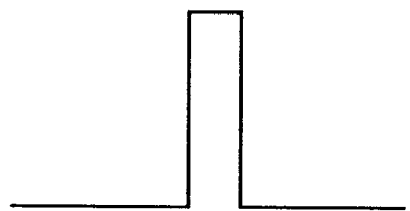
Figure 4C:
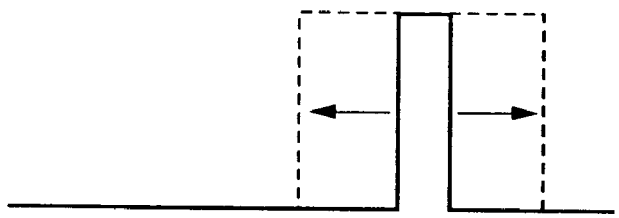

FIGS. 4A to 4C illustrate the operation of the comparator unit 5c and gate generator 5g. The first waveform (FIG. 4A) illustrates a single noise spike occurring in a multipath noise burst. The next waveform (FIG. 4B) illustrates the output of the comparator unit 5c, referred to below as the multipath noise detection signal. The noise spike is detected as a single pulse. The gate generator 5g delays and enlarges this pulse, as indicated in the third waveform (FIG. 4C). The enlargements are shown with dotted lines because the degree of enlargement varies, depending on the state information received from the signal state determiner 13. The delay D also depends on this state information, as will be described later.

The threshold generator 5d generates the threshold signal by smoothing and limiting the output of the absolute-value calculation unit 5b. Accordingly, the threshold signal is not constant, but tracks variations in the average level of the absolute value of the high-frequency signal output by the high-frequency signal extractor 5ab. The reason for using this type of threshold signal is that under adverse receiving conditions, as the field strength at the receiving antenna 1 deteriorates, so does the signal-to-noise (S/N) ratio of the demodulated signal, raising the base noise level or 'noise floor' and causing the high-frequency signal extractor 5ab to generate an increasing level of output due to noise other than multipath noise. The threshold value used by the comparator unit 5c must be high enough so that the comparator unit 5c does not detect noise that is part of the general noise floor.

The delay unit 5e delays the demodulated signal for the length of time taken by the high-frequency signal extractor 5ab, comparator unit 5c, threshold generator 5d, and gate generator 5g to detect multipath noise therein and generate the gate signal. The resulting delayed demodulated signal is supplied to the replacement unit 5f.

The smoothing unit 5h smoothes the demodulated signal, and supplies the smoothed signal to the replacement unit 5f. The smoothing process involves a delay substantially equal to the delay imparted by the delay unit 5e. A detailed description of the smoothing unit 5h will be omitted, because a detailed description of a smoothing circuit in the threshold generator 5d will be given later.

The replacement unit 5f operates as both a latch and a switch. When the gate signal output by the gate generator 5g is at the low level, indicating that the delayed demodulated signal is free of multipath noise, the replacement unit 5f passes the delayed demodulated signal received from the delay unit 5e to the impulse noise reducer 6. When the gate signal goes high, the replacement unit 5f latches the current value of the smoothed demodulated signal received from the smoothing unit 5h. While the gate signal remains high, the replacement unit outputs the latched value to the impulse noise reducer 6, in place of the delayed demodulated signal. When the gate signal goes low again, the replacement unit 5f resumes output of the delayed demodulated signal received from the delay unit 5e. The signal output by the replacement unit 5f will be referred to as the corrected output signal.

Figure 3D:
Figure 3E:
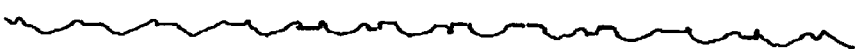

The corrected output signal is illustrated by the waveform in FIG. 3E. During each of the gate pulses in the 3D, the corrected output signal remains constant. For simplicity, the delay introduced by the gate generator 5g is ignored in this waveform (FIG. 3E) and the preceding waveform (FIG. 3D).

Each spike in the multipath noise is thereby replaced with a smoothed version of the preceding demodulated signal value. The reason for using a smoothed value, instead of the actual demodulated signal value preceding the spike, is that the part of the demodulated signal waveform immediately preceding each noise spike is somewhat distorted by the noise spike, so use of a value latched from this part of the waveform might lead to audio distortion. By replacing each noise spike with a smoothed value, the multipath noise reducer 5 is able to remove the noise spikes without risking such distortion. Moreover, by replacing only the noise spikes, and not the parts of the waveform between the noise spikes, the multipath noise reducer 5 is able to avoid loss of the audio signal even during relatively long episodes of multipath noise.

Next, more detailed descriptions of several of the components of the multipath noise reducer 5 will be given.

Figure 5:
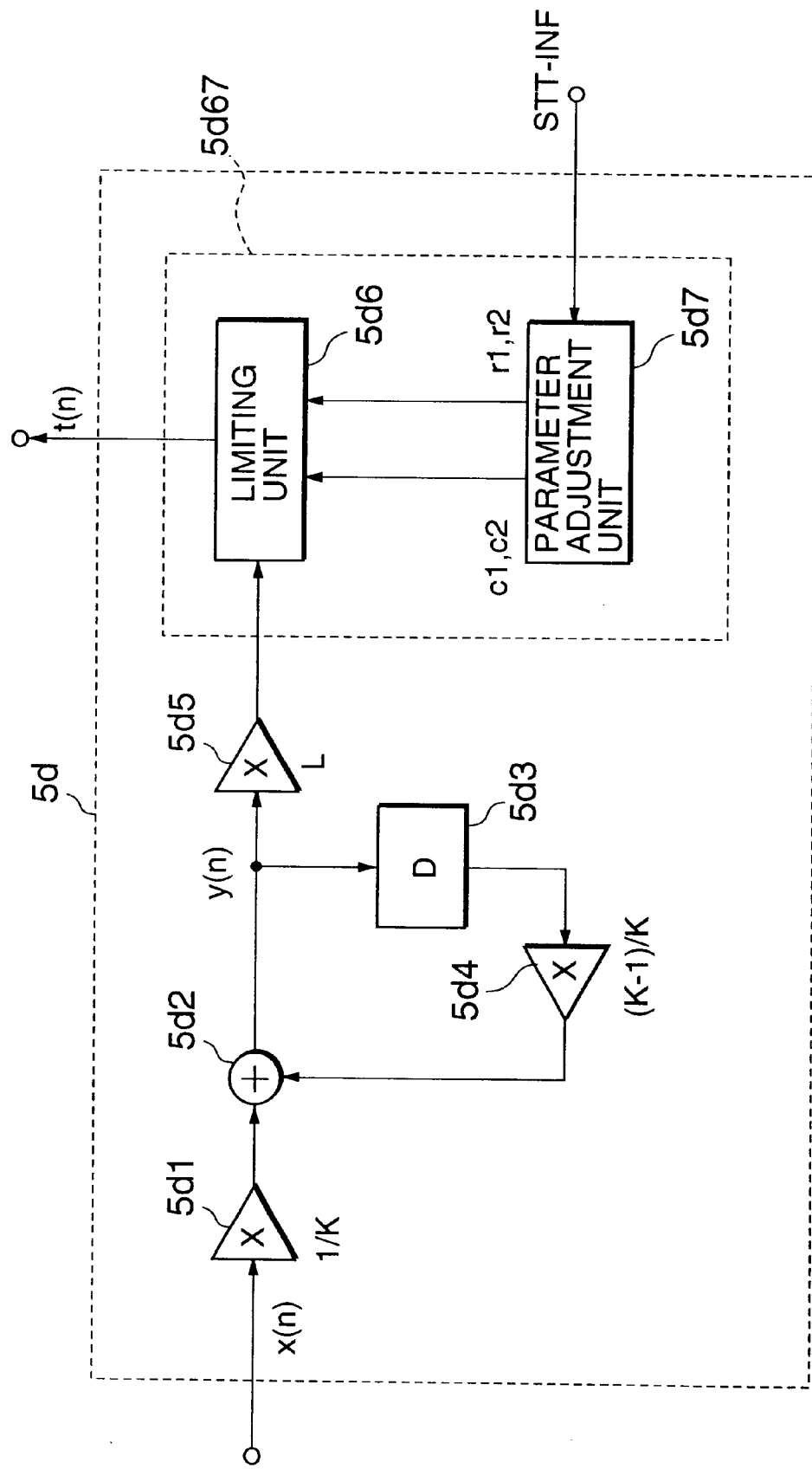
FIG. 5 is a block diagram illustrating one possible structure of the threshold generator in FIG. 1.
Figure 7A:
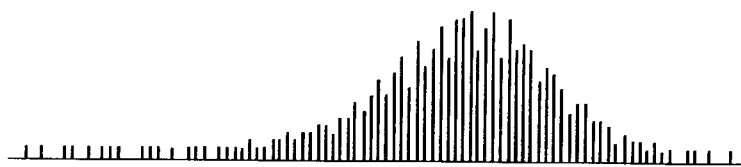
FIGS. 7A to 7D are waveform diagrams illustrating the operation of the parameter adjustment unit in FIG. 5.
Figure 7B:
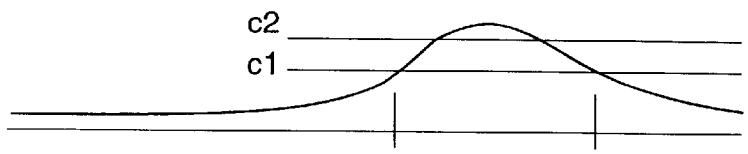
Figure 7C:
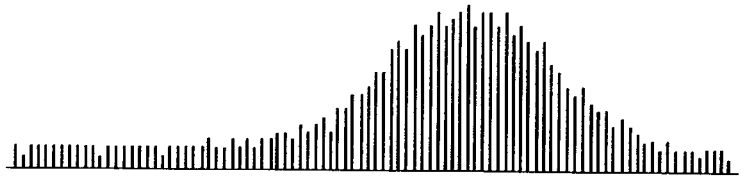
Figure 7D:
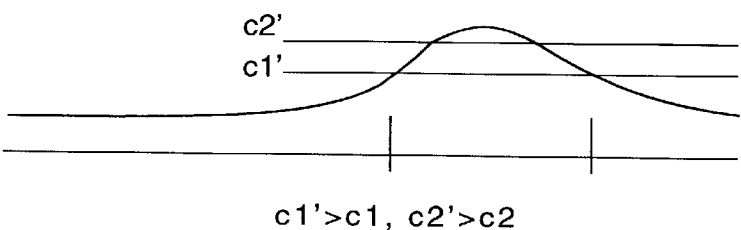

FIG. 5 shows a circuit that can be used as the threshold generator 5d. The values received from the high-frequency signal extractor 5ab are denoted x(n), n being a discrete time variable; x(n) will also be referred to as the n-th sample received from the high-frequency signal extractor 5ab. The letter K denotes a positive constant that operates as a time constant. Roughly speaking, the threshold generator 5d smoothes out variations lasting less than K samples in the output of the high-frequency signal extractor 5ab. The letter L is a coefficient or gain by which the smoothed value is multiplied to raise the threshold value above the noise floor. L is set to produce a threshold value intermediate between the noise floor level and the typical noise level when multipath noise is present.

The circuit in FIG. 5 comprises multipliers 5d1, 5d4, 5d5, an adder 5d2, a one-sample delay unit 5d3, a limiting unit 5d6, and a parameter adjustment unit 5d7. Multiplier 5d1 multiplies the n-th received sample x(n) by 1/K. Adder 5d2 adds the outputs of multipliers 5d1 and 5d4 to obtain a smoothed signal y(n). Delay unit 5d3 delays the smoothed signal y(n) by one sample period and supplies the delayed signal y(n−1) to multiplier 5d4. Multiplier 5d4 then multiplies the delayed signal y(n−1) by (K−1)/K. The smoothed signal y(n) is accordingly given by the following equation.

$$y(n)=(1/K)\cdot x(n)+\{(K-1)/K\}\cdot y(n-1)$$

Multipliers 5d1, 5d4, adder 5d2, and delay unit 5d3 constitute a high-frequency smoothing unit. Multiplier 5d5 multiplies the smoothed signal y(n) by L and supplies the result to the limiting unit 5d6. The limiting unit 5d6 compares the received signal L·y(n) with two values c1, c2 supplied by the parameter adjustment unit 5d7 (c1<c2), replaces L·y(n) with a smaller value r1 if L·yn)exceeds c1, replaces L·y(n) with a still smaller value r2 if L·y(n) exceeds c2, and thereby obtains the threshold signal t(n) supplied to the comparator unit 5c. The values of r1 and r2 are also supplied by the parameter adjustment unit 5d7. The threshold signal t(n) can be described by the following equations.

$$t(n)=L\cdot y(n \text{ when } L\cdot y(n) \leq c1$$

$$t(n)=r1 \text{ when } c1<L\cdot y(n)\leq c2$$

$$t(n)=r2 \text{ when } c2<L\cdot y(n)$$

The parameter adjustment unit 5d7 selects c1, c2, r1, and r2 on the basis of the state information (STT-INF) obtained from the signal state determiner 13, indicating whether receiving conditions are good or bad. The limiting unit 5d6 and parameter adjustment unit 5d7 constitute an adaptive limiting unit 5d67.

FIGS. 6A to 6D illustrate how the threshold value t(n) varies during periods when multipath noise is present and absent. The first waveform (FIG. 6A) is the signal x(n) received from the high-frequency signal extractor 5ab during a certain interval, indicated schematically using vertical lines. Multipath noise begins about halfway through this interval. As is commonly the case, there is considerable variation in the height of the multipath noise spikes.

The next waveform (FIG. 6B) is the smoothed waveform L·y(n) output from multiplier 5d5. If this waveform were to be used directly as the threshold value, some of the smaller noise spikes in the multipath noise interval might be missed.

The next waveform (FIG. 6C) shows the smoothed signal L·y(n) again, and the two comparison values (c1, c2) supplied by the parameter adjustment unit 5d7. The last waveform (FIG. 6D) shows the threshold signal t(n) output by the limiting unit 5d6. During the multipath noise interval, the threshold value is reduced first to r1, then to r2, then again to r1. While the threshold value is limited to these relatively low values (r1, r2), no noise spikes are missed.

The parameter adjustment unit 5d7 raises the comparison values (c1, c2) and limit values (r1, r2) as receiving conditions deteriorate; that is, as the received field strength decreases. When receiving conditions improve, these values (c1, c2, r1, r2) are lowered again. FIGS. 7A to 7D show this process for two cases, in both of which multipath noise begins halfway through the illustrated interval. The first waveform (FIG. 7A) is the output of the high-frequency signal extractor 5ab under good reception conditions, with a strong electric field received at the antenna 1. The second waveform (FIG. 7B) shows the smoothed signal L·y(n) and the two comparison values c1, c2 selected by the parameter adjustment unit 5d7 under these conditions. The third waveform (FIG. 7C) shows the output of the high-frequency signal extractor 5ab under poor reception conditions, with a weak electric field. Under these conditions, the noise floor rises, as illustrated in the left part of the fourth waveform (FIG. 7D), and the parameter adjustment unit 5d7 increases the comparison values to higher values c1', c2'. Under both strong and weak field conditions, the comparison values are well above the noise floor, but are low enough to limit the threshold value appropriately during multipath noise.

If the circuit in FIG. 5 uses analog components, then the multipliers 5d1, 5d4, 5d5 are amplifiers with the indicated gain values, the adder 5d2 is a summing amplifier, the delay unit 5d3 is an analog delay line, and n is a continuous time variable.

FIG. 8 shows another circuit that can be used as the threshold generator 5d. This circuit is identical to the circuit in FIG. 5, with the addition of a limiter 5*d*8 on the input side of the first multiplier 5*d*1. The limiter 5*d*8 compares the received sample value x(n) with the output of multiplier 5*d*4; that is, with the delayed smoothed signal y(n−1) multiplied by the quantity (K−1)/K. If x(n) differs greatly from the output of multiplier 5*d*4, the limiter 5*d*8 limits x(n) so that the signal received by multiplier 5*d*1 does not differ from the output of multiplier 5*d*4 by more than a predetermined amount.

The limiter 5*d*8 operates as a type of amplitude-swing limiter, limiting the range of variation of the threshold signal output by the threshold generator 5*d*. Even during intervals of multipath noise, accordingly, the threshold value does not increase too rapidly, enabling an appropriate threshold signal to be obtained without the use of an extremely large value of K. The reduction in the necessary value of K in turn enables the threshold generator 5*d* to track changes in the noise floor more accurately.

Figure 9:
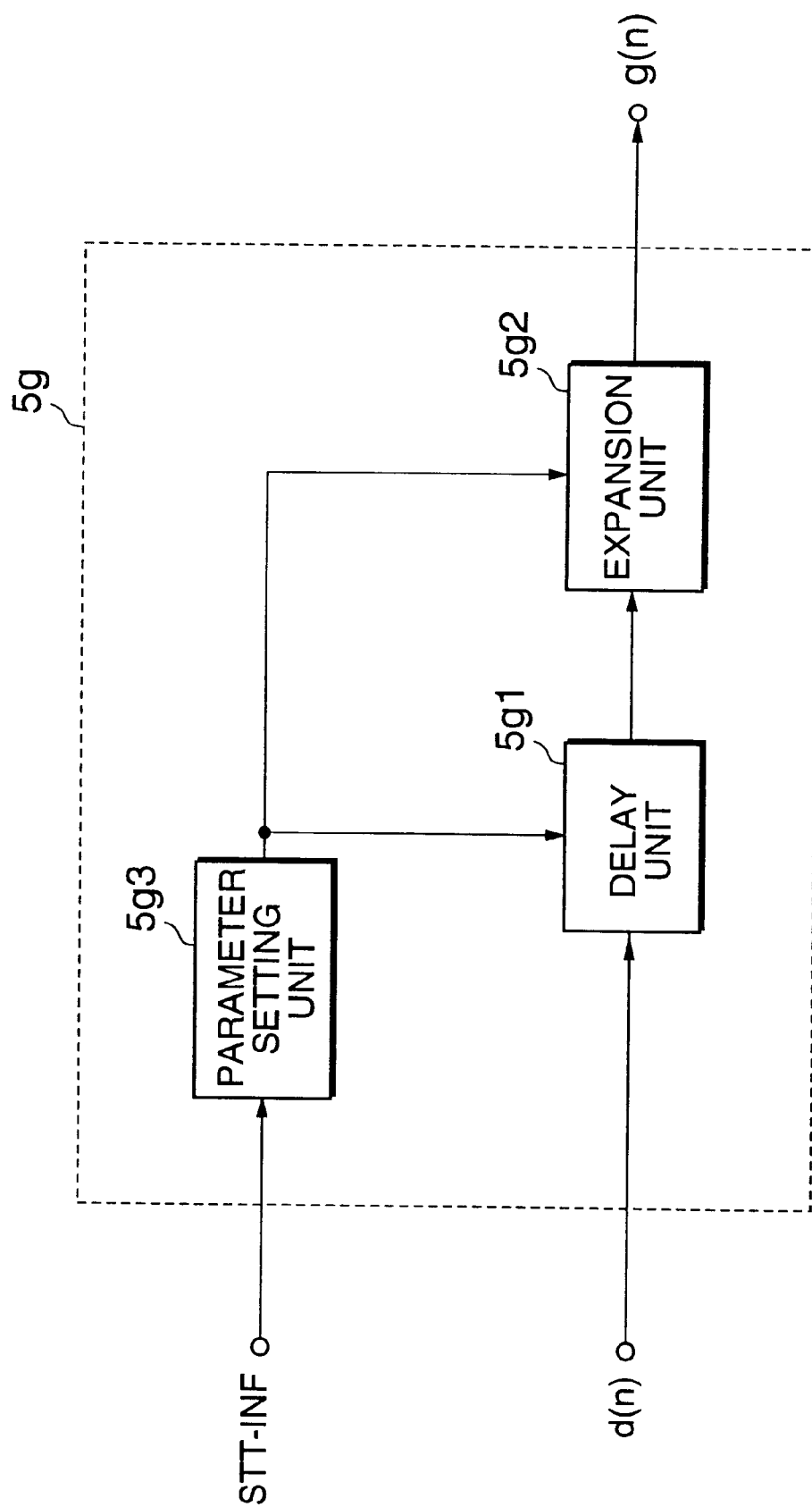
FIG. 9 is a block diagram illustrating the internal structure of the gate generator in FIG. 1.

FIG. 9 shows a circuit that can be used as the gate generator 5*g*. The multipath noise detection signal d(n) received from the comparator unit 5*c* is delayed by a variable amount in a delay unit 5*g*1, then held for a variable length of time in an expansion unit 5*g*2, and finally sent as a gate signal g(n) to the replacement unit 5*f*. The state information (STT-INF) provided by the signal state determiner 13 is received by a parameter setting unit 5*g*3, which controls the delay time applied in the delay unit 5*g*1 and the holding time applied in the expansion unit 5*g*2.

FIGS. 10A to 10D illustrates the operation of the gate generating means 5*g* in FIG. 9. The first waveform (FIG. 10A) shows the multipath noise detection signal output from the comparator unit 5*c*, illustrating a single pulse corresponding to the detection of a single noise spike.

The next waveform (FIG. 10B) shows the gate signal output from the gate generator 5*g* to the replacement unit 5*f* when the gate pulse is delayed but not expanded. In this case, the parameter setting unit 5*g*3 designates a delay D in the delay unit 5*g*1, and a holding time of zero in the expansion unit 5*g*2. The value of D is predetermined so that the delayed gate pulse is centered on the noise spike received by the replacement unit 5*f* from delay unit 5*e*.

Figure 10A:
FIGS. 10A to 10D are waveform diagrams illustrating the operation of the gate generator in FIG. 9.
Figure 10B:
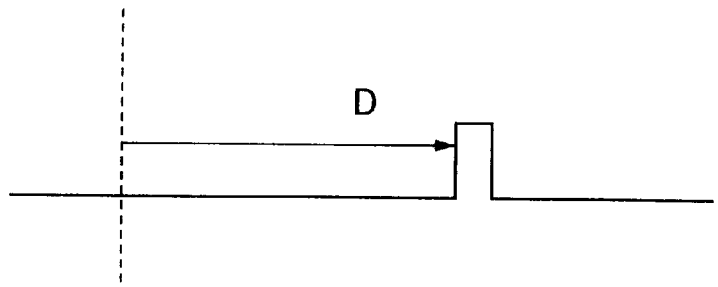
Figure 10C:
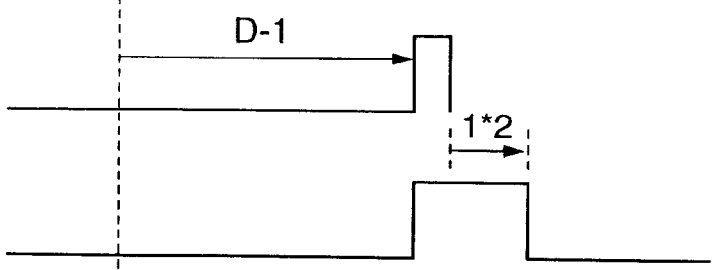
Figure 10D:
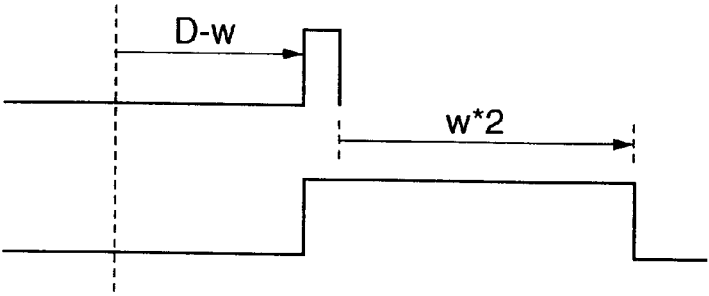

The next waveform (FIG. 10C) shows the gate signal when the pulse is expanded by one unit of time (e.g., one sampling period) both in front and in back. In this case, the parameter setting unit 5*g*3 shortens the delay time by one time unit (from D to D−1), and designates a holding time of two (1*2) time units for the expansion unit 5*g*2. The expanded pulse is consequently centered at the same point as the non-expanded pulse in the preceding waveform (FIG. 10B).

The last waveform (FIG. 10D) shows the gate signal when the pulse is expanded by w units of time both in front and in back, where w is an arbitrary quantity not exceeding D. In this case, the parameter setting unit 5*g*3 designates a delay of D minus w time units (D−w) in the delay unit 5*g*1, and a holding time of two times w time units (w*2) in the expansion unit 5*g*2. The expanded pulse is again centered at the same point as the non-expanded pulse.

The gate generator 5*g* thus outputs gate pulses that are expanded by varying amounts, depending on the state information received from the signal state determiner 13, but are always centered on the corresponding noise spikes.

As noted above, the signal state determiner 13 receives both the S-meter signal indicating the received field strength at the antenna 1, and the audio signals output by the stereo demodulator b7. The signal state determiner 13 provides the parameter setting unit 5*g*3 with information indicating both the received field strength and the audio signal level. The parameter setting unit 5*g*3 increases the amount of expansion (w) as the received field strength decreases, because under weak field conditions, the effects of multipath noise become relatively greater, so more of the noise must be removed. The parameter setting unit 5*g*3 also increases the amount of expansion (w) as the audio level decreases, because as the audio output becomes more quiet, the effects of multipath noise become more noticeable. Conversely, when the audio level is high, the effects of multipath noise tend to be masked by the strong audio output, and it is more important to avoid unnecessary blocking of the audio signal than to remove all of the multipath noise.

By replacing noise spikes with a smoothed version of the demodulated signal, and by adapting the operation of the threshold generator 5*d* and gate generator 5*g* to the reception conditions and the audio signal level, the first embodiment is able to reject multipath noise effectively without causing noticeable audio distortion.

In a variation of the first embodiment, the positions of the impulse noise reducer 6 and stereo demodulator 7 are interchanged. The stereo demodulator 7 now receives the output of the multipath noise reducer 5. The impulse noise reducer 6 receives the output of the stereo demodulator 7, and removes impulse noise from the left- and right-channel audio signals.

Figure 11:
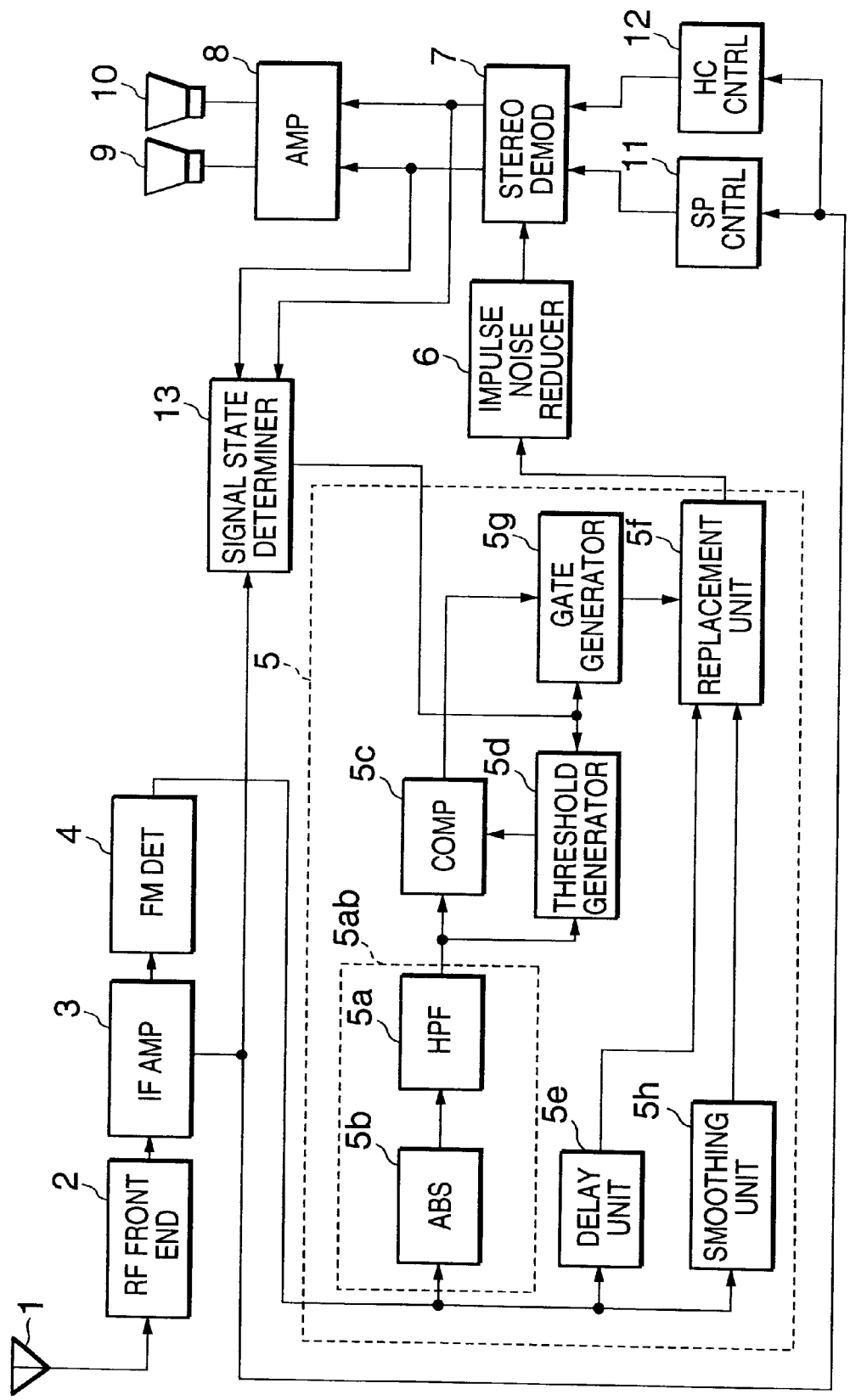
FIG. 11 is a block diagram of an FM stereo radio receiver illustrating a second embodiment of the invention.

As a second embodiment of the invention, FIG. 11 shows an FM stereo radio receiver that differs from the first embodiment only in the internal configuration of the high-frequency signal extractor in the multipath noise reducer. The high-frequency signal extractor 50*ab* in the multipath noise reducer 50 in the second embodiment has the same high-pass filter 5*a* and absolute-value calculation unit 5*b* as the multipath noise reducer 5 in the first embodiment, but connects them in the reverse order, the high-pass filter 5*a* now following the absolute-value calculation unit 5*b*. Accordingly, the output of the FM detector 4 is supplied to the absolute-value calculation unit 5*b*, the output of the absolute-value calculation unit 5*b* is supplied to the high-pass filter 5*a*, and the output of the high-pass filter 5*a* is supplied to the comparator unit 5*c* and threshold generator 5*d*.

Referring once again to FIGS. 3A to 3E, a typical noise spike in the demodulated signal (FIG. 3A) has a negative component followed by a positive component. It therefore has a falling transition followed by a rising transition, then by another falling transition. In the first embodiment, the high-pass filter 5*a* converts the two falling transitions to negative values and the rising transition to positive values, producing a negative component followed by a positive component, then another negative component, as seen in the waveform in FIG. 3B. The absolute-value calculation unit 5*b* then converts the two negative components to positive components, so that all three components are detected above the threshold value, as indicated in the waveform in FIG. 3C.

Figure 12A:
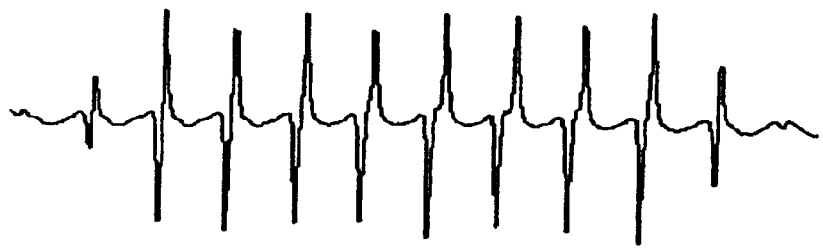
FIGS. 12A to 12E are waveform diagrams illustrating the operation of the multipath noise reducer in FIG. 11.
Figure 12B:
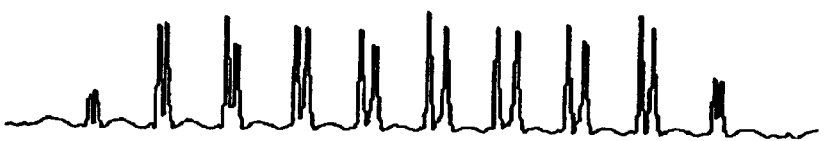
Figure 12C:

Referring to FIGS. 12A to 12E, in the second embodiment, the absolute-value calculation unit 5*b* converts the negative component of each noise spike in the demodulated signal (FIG. 12A) to a positive component, as shown in the waveform in FIG. 12B, so that each noise spike has two positive components. Each noise spike therefore has a rising transition followed by a falling transition, then another rising transition, then another falling transition. The high-pass filter 5*a* converts the two rising transitions to positive values, as indicated in the waveform in FIG. 12C, and the two falling transitions to negative values, which have been omitted from this waveform (FIG. 12C) because they automatically fall below the threshold value, which is indicted by the dotted line.

Figure 12D:
Figure 12E:
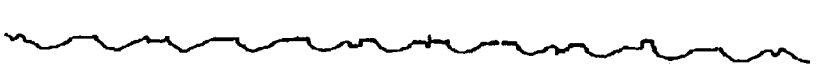

In the second embodiment, accordingly, only the leading edges of the negative and positive components of each noise spike are detected. The gate pulses, shown in FIG. 12D, are narrower than in the first embodiment, which detected both leading and trailing edges. The signal output from the multipath noise reducer 50, shown in FIG. 12E, therefore includes more of the actual waveform of the demodulated signal than in the first embodiment. The gate pulses in the second embodiment (FIG. 12D) represent the actual widths of the noise spikes more accurately. Thus in eliminating multipath noise, the second embodiment causes even less distortion of the audio output signal than does the first embodiment.

Another advantage of the second embodiment is that the high-pass filter 5a can have a simpler internal structure than in the first embodiment. To detect multipath noise spikes accurately, the high-pass filter 5a in the first embodiment requires a sharp cut-off characteristic, to avoid spreading out the noise spikes. The high-pass filter 5a in the second embodiment does not require such a sharp cut-off characteristic; more spreading of the noise spikes can be tolerated, because only leading edges are detected. Thus the high-pass filter 5a can be less expensive and more compact in the second embodiment than in the first embodiment.

The variations described in the first embodiment can also be applied in the second embodiment.

Those skilled in the art will recognize that further variations of the embodiments described above are possible within the scope claimed below.

What is claimed is:

1. A multipath noise reducer for reducing multipath noise in an input signal, comprising:
   a signal state determiner determining a state of said input signal, thereby generating state information;
   a threshold generator coupled to said signal state determiner, generating a threshold value responsive to said state information;
   a high-frequency signal extractor detecting high-frequency components of said input signal, thereby obtaining a high-frequency signal;
   a comparator unit coupled to said threshold generator and said high-frequency signal extractor, comparing said high-frequency signal with said threshold value, thereby generating a multipath noise detection signal; and
   a correction unit coupled to said comparator unit, modifying said input signal responsive to said multipath noise detection signal and said state information, thereby generating a corrected output signal.

2. The multipath noise reducer of claim 1, further comprising an input smoothing unit smoothing the input signal and supplying a smoothed input signal to the correction unit.

3. The multipath noise reducer of claim 2, wherein the correction unit comprises:
   a gate generator generating a gate signal by expanding pulses in the multipath noise detection signal by an amount depending on said state information; and
   a replacement unit latching a value of said smoothed input signal during each expanded pulse in said gate signal, and replacing the input signal with the latched value during the expanded pulse.

4. The multipath noise reducer of claim 3, wherein the signal state determiner detects a received field strength of said input signal, and the gate generator expands said pulses by increasing amounts as said received field strength decreases.

5. The multipath noise reducer of claim 3, wherein the signal state determiner detects an audio level of said input signal, and the gate generator expands said pulses by increasing amounts as said audio level decreases.

6. The multipath noise reducer of claim 1, wherein the high-frequency signal extractor includes a high-pass filter and an absolute-value calculation unit.

7. The multipath noise reducer of claim 6, wherein the high-pass filter receives input from the absolute-value calculation unit.

8. The multipath noise reducer of claim 1, wherein the threshold generator comprises:
   a high-frequency smoothing unit smoothing said high-frequency signal, thereby generating a smoothed high-frequency signal; and
   an adaptive limiting unit limiting the smoothed high-frequency signal responsive to said state information, thereby generating the threshold value.

9. The multipath noise reducer of claim 8, wherein the threshold generator further comprises a limiter that limits variations of said high-frequency signal before said high-frequency signal is smoothed.

10. The multipath noise reducer of claim 8, wherein said adaptive limiting unit comprises:
    a parameter adjustment unit selecting a comparison value and a limit value responsive to said state information; and
    a limiting unit comparing said smoothed high-frequency signal with said comparison value, and reducing said smoothed high-frequency signal to said limit value when said smoothed high-frequency signal exceeds said comparison value.

11. The multipath noise reducer of claim 10, wherein said signal state determiner detects a received field strength of said input signal, and said parameter adjustment unit increases said comparison value as said received field strength decreases.

12. An audio output circuit including the multipath noise reducer of claim 1.

13. An FM receiver receiving a frequency-modulated signal and performing stereo audio output, having an FM detector demodulating the frequency-modulated signal, thereby generating an FM demodulated signal, comprising:
    the multipath noise reducer of claim 1, receiving said FM demodulated signal as said input signal; and
    an impulse noise reducer rejecting impulse noise included in said corrected output signal.

14. A method of reducing multipath noise in an input signal, comprising the steps of:
    (a) determining a state of said input signal, thereby generating state information;
    (b) generating a threshold value responsive to said state information;
    (c) detecting high-frequency components of said input signal, thereby obtaining a high-frequency signal;
    (d) comparing said high-frequency signal with said threshold value, thereby generating a multipath noise detection signal; and
    (e) modifying said input signal responsive to said multipath noise detection signal and said state information, thereby generating a corrected output signal.

15. The method of claim 14, wherein said step (e) further comprises the steps of:
    (f) smoothing the input signal, thereby generating a smoothed input signal;

(g) generating a gate signal by expanding pulses in the multipath noise detection signal by an amount depending on said state information;

(h) latching a value of said smoothed input signal during each expanded pulse in said gate signal; and (i) replacing the input signal with the latched value during the expanded pulse.

16. The method of claim 14, wherein said step (c) further includes the steps of:

(j) taking an absolute value of said input signal; and (k) high-pass filtering of said absolute value.

17. The method of claim 14, wherein said step (b) further comprises the steps of:

(l) smoothing said high-frequency signal, thereby generating a smoothed high-frequency signal;

(m) selecting a comparison value and a limit value responsive to said state information;

(n) comparing said high-frequency signal with said comparison value; and (o) reducing said high-frequency signal to said limit value when said high-frequency signal exceeds said comparison value.

18. The method of claim 17, wherein said step (b) further comprises the step of:

(p) limiting variations of said high-frequency signal before said high-frequency signal is smoothed in said step (l).

19. A machine-readable medium having stored thereon a plurality of executable instructions, the plurality of instructions comprising instructions to:

determine a state of an input signal to generate state information;

generate a threshold value responsive to said state information;

detect high-frequency components of said input signal to generate a high-frequency signal;

compare said high-frequency signal with said threshold value to generate a multipath noise detection signal; and modify said input signal responsive to said multipath noise detection signal and said state information to generate a corrected output signal.

20. The medium of claim 19, wherein said instructions to modify include instructions to:

generate a gate signal by expanding pulses in the multipath noise detection signal by an amount responsive to said state information; and latch a value of a smoothed version of said input signal during each expanded pulse and replacing the input signal with the latched value during the expanded pulse.

21. The medium of claim 20, wherein said instructions to generate a gate signal include instructions to expand said pulses by increasing amounts responsive to decreases in field strength of said input signal included within said state information.

22. The medium of claim 20, wherein said instructions to generate a gate signal include instructions to expand said pulses by increasing amounts responsive to decreases in audio level of said input signal included within said state information.

* * * * *